(12) United States Patent
Salvi et al.

(10) Patent No.: US 7,684,516 B2
(45) Date of Patent: Mar. 23, 2010

(54) METHOD AND APPARATUS FOR IMPROVING SIGNAL RECEPTION IN A RECEIVER

(75) Inventors: Raul Salvi, Boca Raton, FL (US); Jerry T. Bolton, Jr., Aventura, FL (US); Charles R. Ruelke, Margate, FL (US)

(73) Assignee: Motorola, Inc., Schaumburg, IL (US)

(*) Notice: Subject to any disclaimer, the term of this patent is extended or adjusted under 35 U.S.C. 154(b) by 667 days.

(21) Appl. No.: 11/380,892

(22) Filed: Apr. 28, 2006

(65) Prior Publication Data
US 2007/0253511 A1    Nov. 1, 2007

(51) Int. Cl.
*H03K 9/00*    (2006.01)
(52) U.S. Cl. .................. 375/316; 375/238; 375/340; 455/232.1; 455/245.1; 455/245.2
(58) Field of Classification Search ............ 375/262, 375/265, 340, 341, 269, 279, 362, 355, 308, 375/334, 238, 34, 141, 233–236; 708/315, 708/420, 490, 5, 8, 21, 404; 714/48, 751, 714/752, 758, 755, 786, 795; 455/232.1, 455/242.2, 245.1, 245.2, 246.1, 250.1, 161.3, 455/184.1, 197.1
See application file for complete search history.

(56) References Cited

U.S. PATENT DOCUMENTS

| | | | | |
|---|---|---|---|---|
| 4,769,768 A | * | 9/1988 | Bomba et al. | 710/268 |
| 5,687,188 A | * | 11/1997 | Feeney et al. | 375/220 |
| 5,765,127 A | * | 6/1998 | Nishiguchi et al. | 704/208 |
| 6,173,018 B1 | * | 1/2001 | Kuroki | 375/317 |
| 6,173,918 B1 | | 1/2001 | Kuroki | |
| 6,879,645 B1 | * | 4/2005 | Webber et al. | 375/317 |
| 7,227,916 B2 | * | 6/2007 | Ruelke et al. | 375/345 |
| 7,453,912 B2 | * | 11/2008 | Laroia et al. | 370/526 |

FOREIGN PATENT DOCUMENTS

| | | |
|---|---|---|
| WO | 2007127565 A2 | 11/2007 |
| WO | 2007127565 A3 | 11/2007 |

OTHER PUBLICATIONS

PCT International Preliminary Report Application No. PCT/US2007/065033 Dated Nov. 6, 2008—8 Pages.
PCT International Search Report and Written Opinion Application No. PCT/U52007/065033 Dated Apr. 14, 2008—9 Pages.

* cited by examiner

*Primary Examiner*—David C Payne
*Assistant Examiner*—Rahel Guarino
(74) *Attorney, Agent, or Firm*—Barbara R. Doutre (57) ABSTRACT

A method and apparatus for improving signal reception in a receiver (100) by performing all-channel and/or on-channel estimations on a received signal so as to predict future RF environments. The prediction is achieved through the use of one or more detector systems (122, 124) positioned to sample and detect predetermined signal metrics of the received signal (103) prior to analog-to-digital conversion (112) and subsequent post-processing (114). Future estimations of the channel condition are thus generated prior to the arrival of the actual samples (115) at a controller section (116). The detectors (122, 124) provide triggers (123, 125) to the controller (116) so that active stages (130) within the receiver (100) can be adjusted and scaled as needed via a serial port interface (SPI) (126) based on signal conditions.

23 Claims, 6 Drawing Sheets

METHOD AND APPARATUS FOR IMPROVING SIGNAL RECEPTION IN A RECEIVER

FIELD OF THE INVENTION

The present invention relates generally to communication devices and more particularly to improving signal reception in portable radios.

BACKGROUND

Portable communication devices, such as hand-held two-way radios, cell phones, mobile vehicular radios and the like, must operate in very dynamic radio frequency (RF) environments. Signals received by such devices are often subjected to fading and multi-path envelope variations that can corrupt the received signal, increasing bit error rate (BER) and reducing channel efficiency. Today's error correction strategies utilize protocol centric redundancies or post demodulation error correction to mitigate these problems. Both of these mitigation strategies however, encumber the communication device design with increased protocol complexity and/or demodulator processing requirements, thus making implementation more complex.

Accordingly, there is a need to improve receive signal capability in a portable communication device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to improving signal reception in a receiver. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In accordance with the present invention, there is provided herein a method and apparatus for improving signal reception in a receiver of a portable or mobile communication device by performing off-channel and on-channel estimations of a received signal so as to predict future RF environments. The prediction is achieved through the use of one or more detector systems positioned to sample and detect predetermined signal metrics of the received signal prior to analog-to-digital conversion and subsequent post-processing. At least two detectors are contained each detector system. Future estimations of the channel condition are thus generated prior to the arrival of the actual samples at a controller section. The detectors provide triggers to the controller so that active stages within the receiver can be adjusted and scaled as needed.

Figure 1:
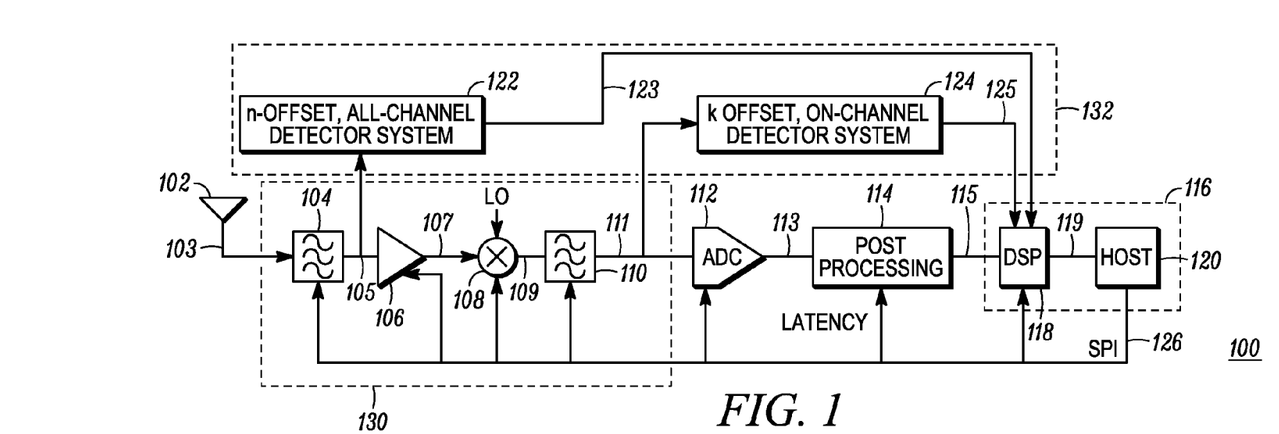
FIG. 1 is a block diagram of a receiver formed and operating in accordance with the present invention.

FIG. 1 is a block diagram of a receiver 100 operating in accordance with the present invention. Receiver block diagram 100 generally includes an antenna 102, a pre-selector filter 104, a low noise amplifier (LNA) 106, a mixer 108, an intermediate frequency (IF) filter 110, and an analog to digital converter (ADC) 112 all under control of controller section 116, formed here of a digital signal processor 118 and host microprocessor 120. For the purposes of this application and for most receivers in general, the analog hardware located prior to ADC 112 is generally referred to as the receiver's front-end 130. Post processing circuitry 114, found in typical receivers after the ADC 112, performs such functions as decimation, filtering and formatting of the digital signal, but also creates a latency in the receive signal path.

In accordance with the present invention, receiver 100 further includes a channel estimator 132 formed of at least one detector system, shown here as first and second detector systems 122, 124 for detecting all-channel and on-channel signal metrics respectively. The all-channel signal metrics detected by the first detector system 122 may include both off-channel and on-channel metrics. First detector system 122 includes at least two "n" detectors for verifying whether the all-channel metrics exceed one or more thresholds. Second detector system 124 includes at least two "k" detectors for determining whether the on-channel signal exceeds another set of one or more thresholds. The channel estimator 132 provides scalable thresholds generating metrics for the received signal modulation and/or general telemetry indicative of channel dynamics.

In operation, antenna 102 receives RF signal 103 for filtering through preselector filter 104 and presenting a filtered RF signal 105 to low noise amplifier 106. Low noise amplifier 106 generates amplified signal 107 which is mixed at mixer 108 with a local oscillator (LO) signal. Mixer 108 produces intermediate frequency (IF) signal 109 which is filtered at IF filter 110 into filtered IF signal 111 and forwarded to analog-to-digital (A/D) converter 112 for conversion to a digital signal 113. Digital signal 113 is subjected to post processing stage 114, where post processing activity is performed in order to provide a synchronous data signal 115 capable of being processed by the DSP 118.

In accordance with the present invention, filtered RF signal 105 is sent to first detector system 122 for detecting the presence of all-channel signals passing through preselector filter 104 that meet or exceed one or more of the thresholds set by the "n" detectors. In accordance with the present invention, filtered IF signal 111 is sent to second detector system 124 for signal detection. Second detector system 124 is said to be the on-channel detector given that signal 111 has been filtered to a single channel by the IF filter 110. The first and second detector systems 122, 124 are set with predetermined thresholds for each desired metric. For the all-channel signals that exceed at least one predetermined threshold set by first detector system 122, a detector output 123 is provided to trigger DSP 118. For the on-channel signals meeting the predetermined thresholds set by second detector system 124, a detector output 125 is also provided to trigger DSP 118.

In response to being triggered, and in accordance with the present invention, DSP 118 indicates to host 120 that adjustments are needed to optimize the received signal. These adjustments may include scaling the thresholds set by detector systems 122, 124; adjusting an integration period within the detector systems 122, 124 so as to fix or track the received RF and IF signal power 105, 111; adjusting front-end hardware; and/or adjusting functions of controller 116 such as scaling processing speeds and algorithm selection. Both the ADC 112 and post processor 114 can also be controlled dynamically based on input signal conditions reported by the detectors 122, 124. Parameters including, but not limited to, clock rate, current, bit width, and noise shaping, are just some of the adjustments possible in these two blocks.

As an example, in response to being triggered by signals 123 and/or 125, DSP 118 can scale forward-error-correction (FEC) parameters, such as block and convolution coding vectors, engage "soft-decoding" algorithms vs. hard decoding algorithms, and/or schedule interrupt service requests (ISRs) so as to reduce the consumption of instructions and intrinsic error correction complexity at host microprocessor 120.

As a further example and as mentioned above, the channel information provided by detector systems 122, 124 can be used to scale the active stages within the receiver 100, such as gain and filter sections, for maximum linearity when required, or to conserve current if environmental conditions warrant. In this case, host microprocessor 120 generates a serial port interface (SPI) signal 126 to make adjustments, as appropriate, to one or more of the active stages such as, LNA 106, mixer 108, filters 104, 110 and/or ADC 112. The adjustment to one or more of these receiver front-end devices impacts the metrics of the RF and IF signals 105, 111 being detected by first and second detectors systems, 124 respectively. The all-channel and on-channel detector systems 122, 124 continue to detect various metrics of the incoming signal and compare detected metrics to thresholds while the controller 116, via DSP 188 and host 120, makes adjustments to the SPI signal 126 for adjusting the receiver front end 130. In this manner, a continuous adjustment loop is formed of detector systems 122, 124, controller 116 and receiver front-end 130 prior to the sampled signal 115 reaching the controller 116.

While FIG. 1 shows a dual conversion receiver with detector system 122 applied to the RF stage and detector 124 applied to the IF stage, a Direct Conversion Receiver can also derive improved signal reception by applying at least one detector system to the RF section and/or baseband section with each detector system providing a plurality of detector thresholds.

Figure 2:
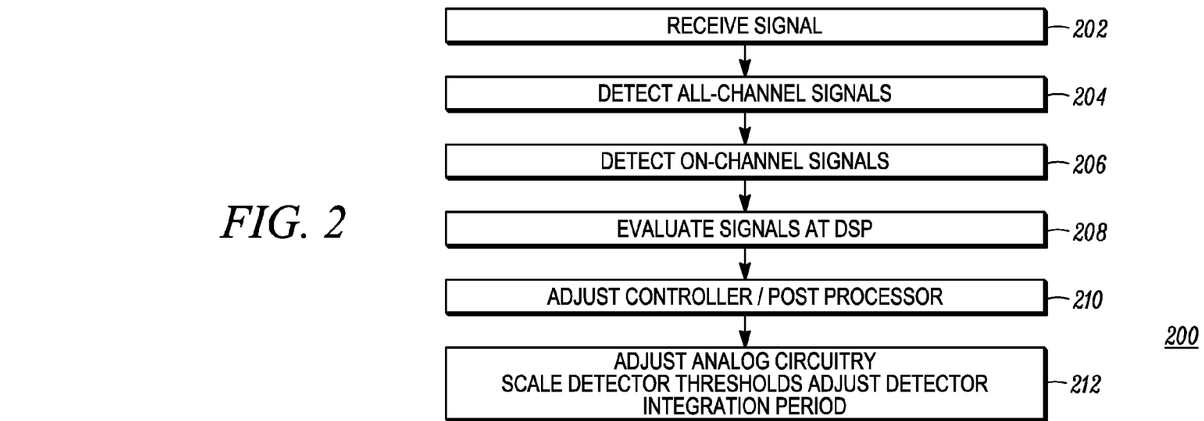
FIG. 2 is flowchart of a method of processing a received signal in accordance with the present invention.

FIG. 2 is a flowchart 200 summarizing a method for processing a received signal in accordance with the present invention. An RF signal is received at step 202 and compared to predetermined set of thresholds to detect all-channel signals and on-channel signals at steps 204, 206 prior to the received signal reaching a latency stage of the receiver. As discussed previously, the all-channel signal detection can include both off-channel and on-channel signal detection. The detected signals are evaluated at the DSP at step 208, and adjustments, if needed, are made at step 210, to the controller section (DSP and/or host) and/or post processor, along with adjustments to the one or more pre-latency analog receiver circuits, scaling of detector thresholds and/or adjustments to the detector integration periods at step 212. By utilizing method 200 of the present invention, it is now possible to determine, several milliseconds before a sample arrives at the DSP that the received signal's RF envelope is varying at a reasonably accurate estimated rate. Thus, fading and dynamic RF environmental effects on the received signal can be mitigated by making adjustments to the front-end circuitry, the ADC, and/or the post processing block 114 and DSP.

Figure 3:
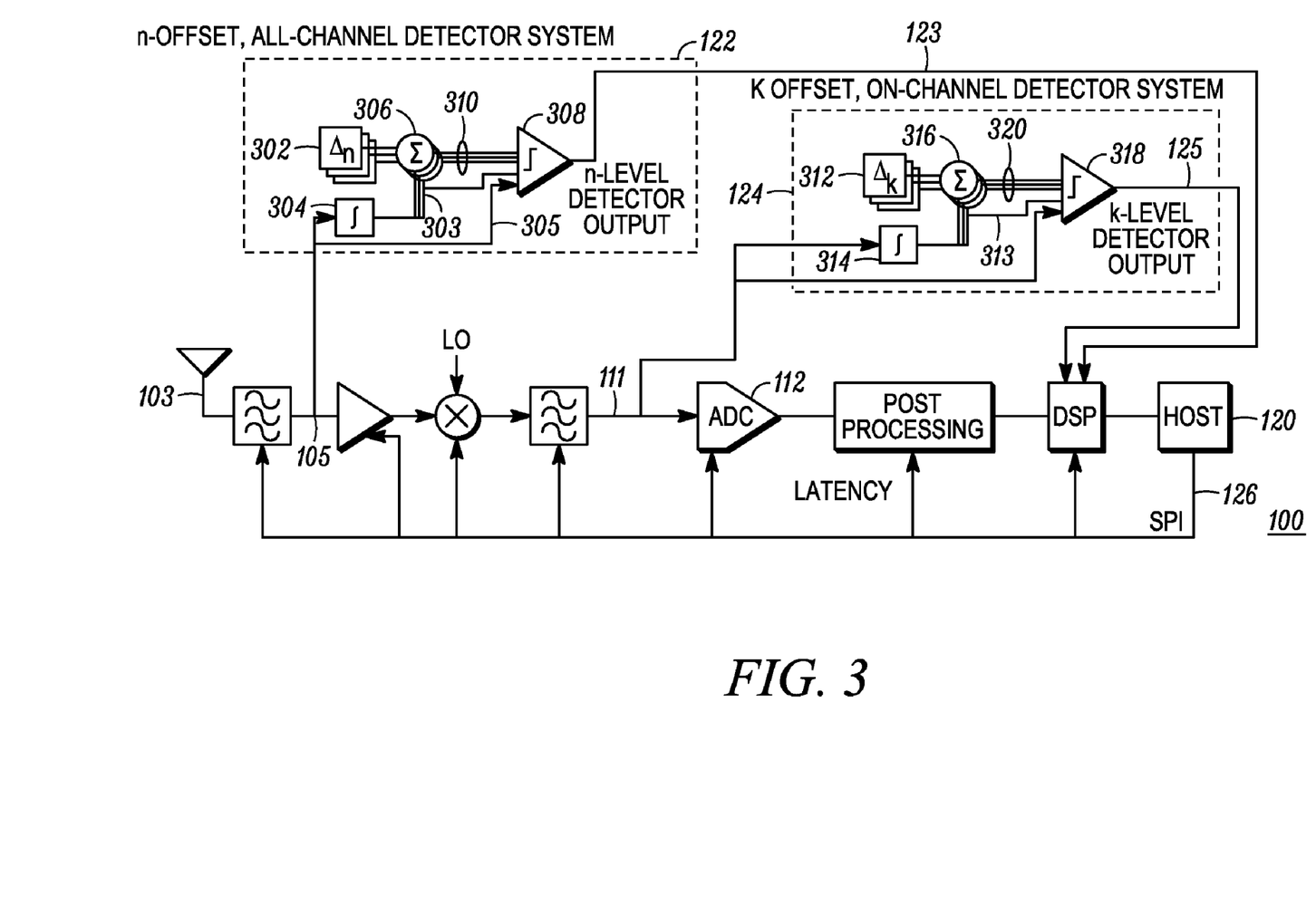
FIG. 3 is an example of detector architectures that can be incorporated into the receiver of FIG. 1 in accordance with an embodiment of the invention.

FIG. 3 is an example of detector architectures that can be incorporated into receiver 100 to detect the all-channel signals and on-channel signals in accordance with an embodiment of the invention. The all-channel detector system 122 includes a plurality of reference detector offsets 302, an integrator 304, a plurality of summers 306 and n-level threshold detector 308. When the fixed offsets 302 are summed at summers 306 with the integrated value 303 from integrator 304, a resulting plurality of thresholds 310 are generated and used by multiple detectors in the n-level detector block 308. The plurality of thresholds 310 vary in time as a function of the integration period set by integrator 304 with fixed offset between threshold values defined by reference 302. The on-channel detector 124 of FIG. 3 has a similar architecture to that of detector system 122 but can have different threshold levels, shown here as k-levels. The on-channel detector 124 includes a plurality of reference detector offsets 312, an integrator 314, a plurality of summers 316 and k-level threshold detector 318.

In accordance with the present invention, signal reception in receiver 100 can be optimized by making adjustments such as: scaling the thresholds set by detector systems 122, 124; adjusting the integration period of integrators 303, 314 to allow signals 303, 313 to fix or track the received RF signal power 105, 111; adjusting front-end hardware; and/or adjusting controller functions such as scaling processing speeds and algorithm selection.

The multi-detector systems 122, 124 of the present invention take the real-time received RF signal 105 and compares it against multiple thresholds set at threshold detector 308 with reference thresholds tracking an integrated value 303 of the input receive signal 105. Subsequent thresholds are offset via threshold detector offsets 302 by offset values delta-n for first detector system 122. The second detector 124 takes received filtered IF signal 111 and compares it against multiple thresholds set at threshold detector 318 with reference thresholds tracking an integrated value 313 of the IF signal 111. Subsequent thresholds are offset via threshold detector offsets 312 by offset values delta-k for second detector 124.

The output of n-level detector 308 and k-level detector 318 is signal 123 and 125 respectively. The logic signal for 123 and 125 is generated based on the following representation.

1) Once the integrated signal 303 or 313 exceeds a specific threshold within the plurality of thresholds 310 or 320 respectively, the output logic from the detector associated with that specific threshold within detector blocks 308 or 318 is held logic high, and continues to be high as long as the integrated signal 303 of 313 exceeds said threshold 2) Once the integrated signal 303 or 313 falls below a specific threshold within the plurality of thresholds 310 or 320 respectively, the output logic from the detector associated with that specific threshold within detectors blocks 308 or 318 is held logic low, and continues to be low as long as the integrated signal 303 of 313 is below said threshold.

3) The output logic 123 and 125 is a composite representation of all threshold values at any given time for the plurality of detectors within 308 and 318 respectively. The logic level of the output of any single detector within 308 and 318 is representative of whether the RF level at the input of said detector is above or below the associated threshold for that detector.

The offsets for the all-channel and on-channel detector system 122, 124 do not have to be the same. Both the integration period of integrator 304 and 314, and delta offset 302 and 312, can be independently controlled by the host 120 via SPI 126. Using the SPI 126 to control the integration period and delta offsets enhances the versatility of the receiver architecture by allowing the multi-detector architecture to generate metrics for the received signal modulation and/or general channel telemetry indicative of channel dynamics. Metrics for the received signal modulation include, but are not limited to, peak-to-average signal ratios, average power and timing rates to name a few. Metrics of general channel telemetry include, but are not limited to, fading, multi-path and presence of blocking signals to name a few.

The integration period set by integrator 304, 314 and separation between thresholds set by reference detector offsets 302, 312 can be adjusted depending on the targeted information. For example, in some receiver systems fading variations can exceed 30 dB with periodicity spanning several 5 to 100's of a mS, while digital modulations can exhibit peak-to-average ratios that approach 6-8 dB constrained to slot lengths of 10 mS to 30 mS or more.

The post analog-to-digital converter (ADC) section presently incorporated is some radio architectures utilizes sample rates of 20 kilo-samples per second (kps), with internal clock and filter structures for the post-ADC processing that introduces a delays approaching 1-2 ms. It is apparent that this latency can be larger or smaller depending on the sample rate, filter type and complexity (e.g. number of taps) and intrinsic clock speeds for the internal digital circuitry; however, digital latencies ranging from 500-800 µs are reasonably expected for many of the digitally centric radio platforms used today. While these delays are reasonably small in absolute time, as a percentage of slot duration in a Time Division Multiple Access (TDM) protocol, 1 mS latency can approach 5-10 percent of a slot length, which is appreciable for many systems. For Frequency Division Multiple Access (FDM) strategies, including analog FM, the latency is not significant but can still be used to advantage in highly dynamic RF environments such as fast fading.

The utilization of multiple on-channel and/or off-channel detectors having known relationships relative to each other allows for a multi-variant and dynamically scalable channel estimator 132 of FIG. 1. The subsequent triggering of specific detectors by the RF signal 103, taken together with relative timing from previous threshold triggers from different detector sets (at different threshold levels) facilitates the generation of channel envelope predictions to be provided to the DSP 118 before the actual channel data 115 arrives to the DSP. The latency associated with the post-processing, decimation and filtering of the on-channel signal allows channel parameters to be provided to the DSP 118 "ahead of time" prior to processing the actual data. Thus, "future estimations" of the channel condition are generated prior to the arrival of the actual samples, which may then be used to scale appropriate adjustments in DSP filtering, processing gain, error correction and hardware adjustments thereby improving BER and linearity in dynamic RF environments, such as multi-path and fast/slow fading environments. Additionally, even in steady state channel environments, the multi-detector strategy of the present invention can be adapted to determine the approximate linearity of the received signal modulation, which can then be used to scale the receiver hardware to either maximize subsystem linearity (such as by increasing the LNA/mixer/ADC current and/or bias adjust current to name a few) or reduce subsystem linearity for constant envelope so as to increase battery life.

Figure 4:
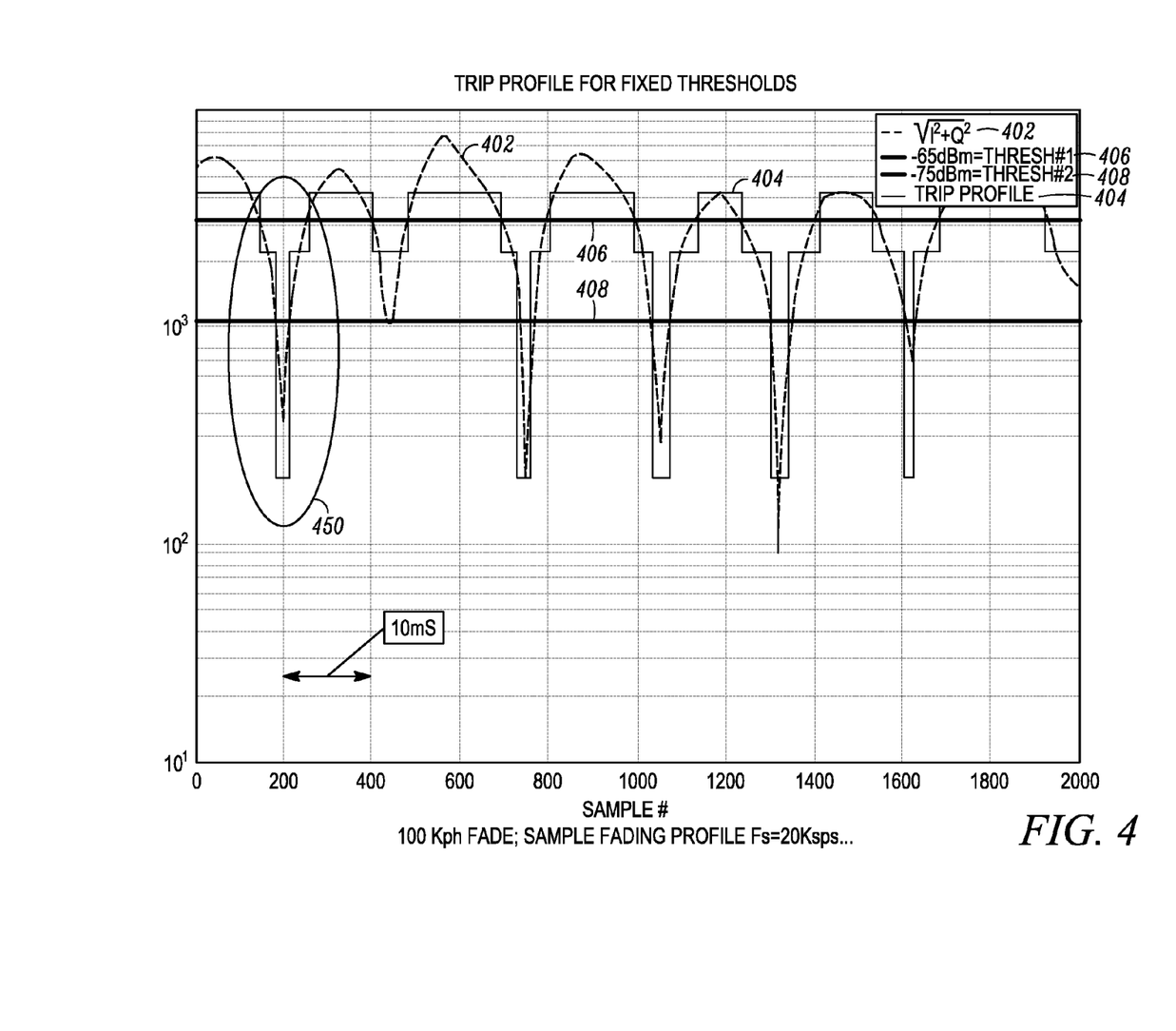
FIG. 4 is an example of a measured RF envelope having a fading profile across dual fixed thresholds in accordance with an embodiment of the invention.

FIG. 4 shows a graph 400 providing an example of a measured fading RF envelope response 402 having minimal hysteresis along with a multi-level trip profile 404 across dual fixed thresholds 406, 408. The fade rate for this measurement was 100 kph and the fixed thresholds 406, 408 were separated by 10 dB (−65 dBm and −75 dBm). The periodicity of trip profiles for dual detectors is a function of the RF envelope rate-of-change and hysteresis setting. Higher hysteresis eliminates fast deep fade detection. It is apparent from graph 400 that significant changes in the RF signal level occurred within 1 mS windows of certain portions of the fading response as indicated by designator 450. Because of the nature of the response being measured, any hysteresis built into the detector system must be very small. For the example of FIG. 4, hysteresis approached 200 µS. The single fade valley 450 and its associated trip profile is shown again in detail in FIG. 5.

Figure 5:
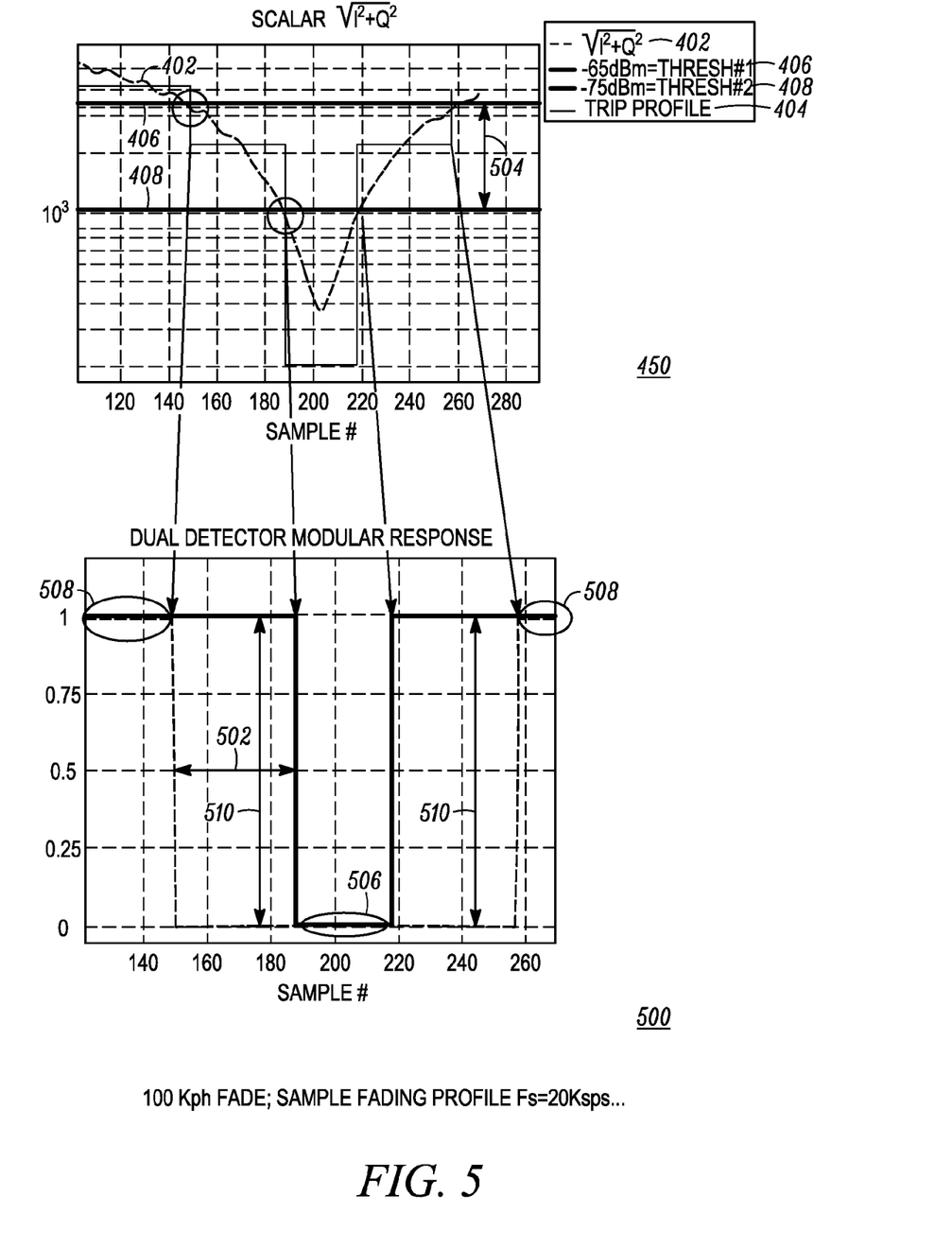
FIG. 5 is an example of a single fade valley taken from FIG. 4 and its associated profile in a receiver operating in accordance an embodiment of the invention.

From the graphs of FIGS. 5A and 5B, it is apparent that a differentiated detector trigger (sequential triggering of differing detector thresholds) may be viewed as a pulse-width modulator, where the pulse time difference between transmissions from different detectors within detector blocks 308 or 318 of FIG. 3 gives both time 502 and amplitude 504 information about the received RF envelope. This may be used to predict future RF environments based on a set of simplifying logic. This logic may include:

1) Any slope calculated from contiguous triggering of different thresholds (differentiated detectors triggering) will be used until a new differentiated detector trigger is detected (510).
2) Inflection for a fade minima (506) or fade peak (508) is located between contiguous detector triggers at the same thresholds with threshold trip logic having the same value for all detectors (all high or all low).
3) A localized inflection of an RF envelope within a multiple detector system (three or more detectors) occurs between contiguous triggers at the same threshold with the direction of the inflection determined by legacy triggering of different threshold states (detector states with different threshold previously triggered prior to contiguous triggering of inflection threshold).
4) The absolute fade maxima are limited to 6 dB above the integrated reference thresholds value from the last trigger.
5) The absolute fade minima are limited 35 dB below the integrated reference threshold value from the last trigger.

Applying the assumptions listed above in a fading environment for multiple detectors within 308 and 318 with fixed thresholds produces slope and timing information from which a "predicted" response may be generated.

Figure 6A:
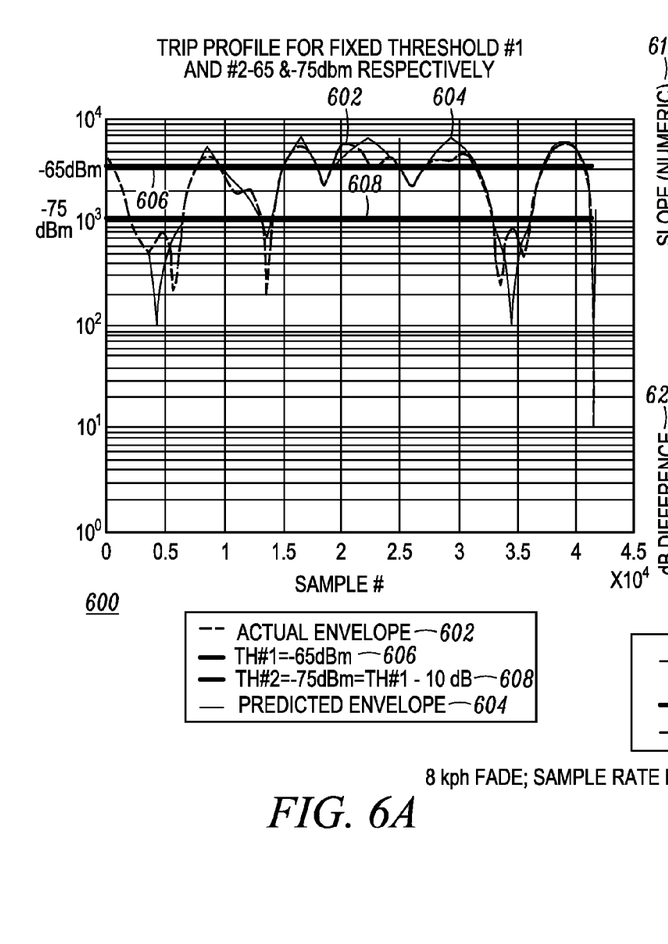
FIG. 6A shows an example of a fading envelope and an associated predicted envelope using fixed threshold levels in accordance with the an embodiment of the invention.
Figure 6B:
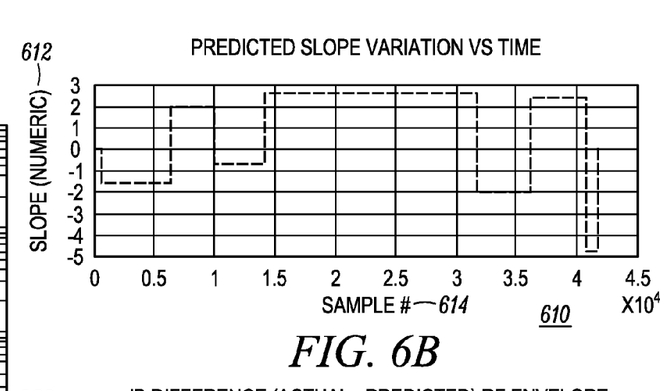
FIG. 6B shows an example of predicted slope variation vs. time in accordance with the an embodiment of the invention.
Figure 6C:
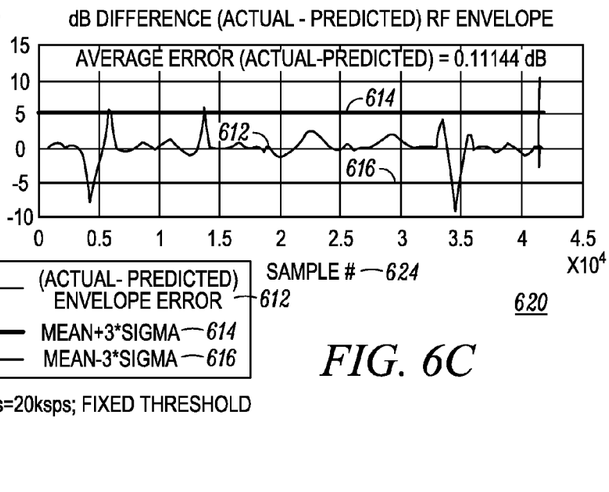
FIG. 6C shows an example of actual-predicted RF envelope average error in accordance with an embodiment of the invention.

FIG. 6 shows an example of a graph 600 representing a fading RF envelope 602 and an associated predicted envelope 604 using fixed threshold levels 606, 608 in accordance an embodiment of the invention. A fixed threshold response can be achieved in the present embodiment by setting the output of integration blocks 304, 314 of FIG. 3 to a fixed constant. In this example, the first fixed threshold is set at −65 dBm and the second fixed threshold is set at −75 dBm. The variations in RF envelope 602 is typical of a signal received by a receiver traveling at 8 kilometers-per-hour (kph), or simply a received signal with a fade rate of 8 kph that is sampled by the ADC (block 112 in FIG. 3) at a sample rate of 20 ksps. The physical dynamics that induce variations in the RF envelope, known as fading or multi-path effects, are well understood by the RF communication system designers, and will not be described in detail here. However, it should be understood that the variations seen in the RF envelope are related to the speed that the receiver is traveling (8 kph, 100 kph, 220 kph), how many RF reflective surfaces are in proximity to the receiver, and how spectrally congested the RF environment is in the vicinity of the RF channel of operation. In addition, FIG. 6B shows graph 610 of the detector slope variation 612 versus time 614, while FIG. 6C shows graph 620 of the dB error 622 versus sample time 624 for the actual-minus-predicted RF envelope 612 and the mean +/−3 sigma 614, 616.

For the fading envelope and fixed threshold profile illustrated by graph 600 (which includes fading valleys approaching 30 dB), it is apparent that the worse case error associated with the predicted envelope relative to the true RF envelope may approach 10 dB (as indicated by graph 620). However, the nominal error is usually much smaller, with error excursions typically being less that 5 dB. The error response can be improved upon by allowing the output of the integrators 304, 314 of FIG. 3 to be variable and proportional to the integrated value of the true RF envelope as will be shown in conjunction with FIG. 7.

Figure 7A:
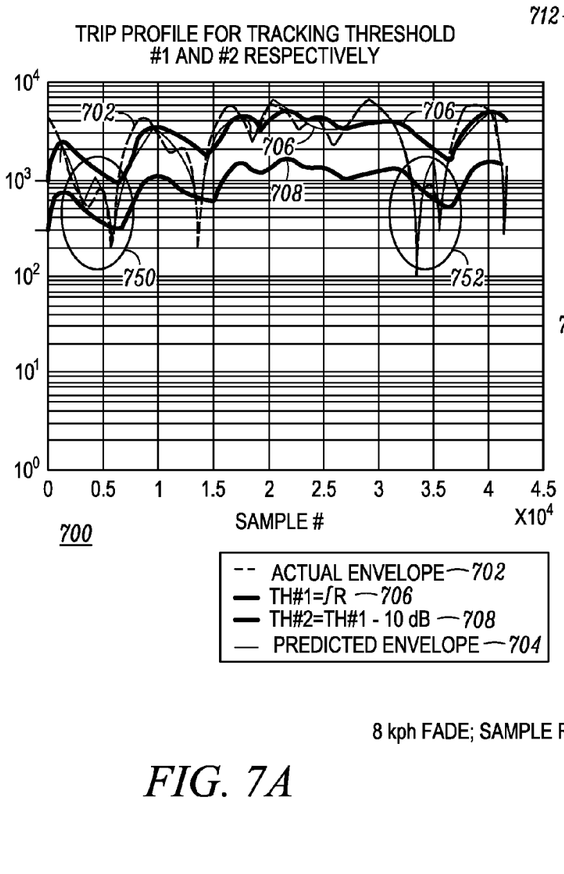
FIG. 7A shows an example of a slow fading envelope and an associated predicted envelope using tracking thresholds in accordance with an embodiment of the invention.

FIG. 7A shows an example of a slow fading envelope 702 and an associated predicted envelope 704 using tracking thresholds 706, 708 in accordance with an embodiment of the invention. As the reference thresholds 706, 708 track the integrated RF envelope, the accuracy of the predicted response 704 increases, with most error excursions being reduced by 3 to 5 dB. The effect of allowing the reference threshold to track the integrated value of the RF envelope (i.e. signal 303 tracks the integrated output of block 304 resulting in the real time variation of threshold level 310 in FIG. 3) causes the threshold to vary as a function of the RF variations. This results in improved tracking of localized inflection points 750, 752 that previously went unrecognized using the fixed threshold strategy. The identification of localized inflection(s) 750, 752 can also be achieved with fixed threshold values; however, this necessitates the use of additional detectors whose thresholds are fixed at level with smaller differences to increase sensitivity to smaller RF variations. Hence, coupling the reference thresholds to the integrated RF envelop mitigates the need for additional detectors to some extent, while adding extra precision in the predicted envelope generation.

Figure 7B:
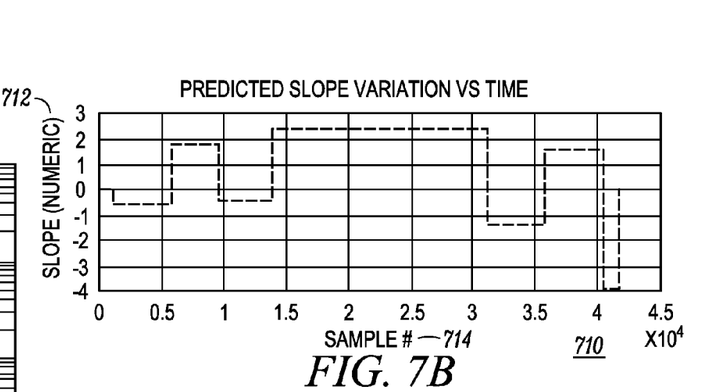
FIG. 7B shows an example of predicted slope variation vs. time in accordance with an embodiment of the invention.
Figure 7C:
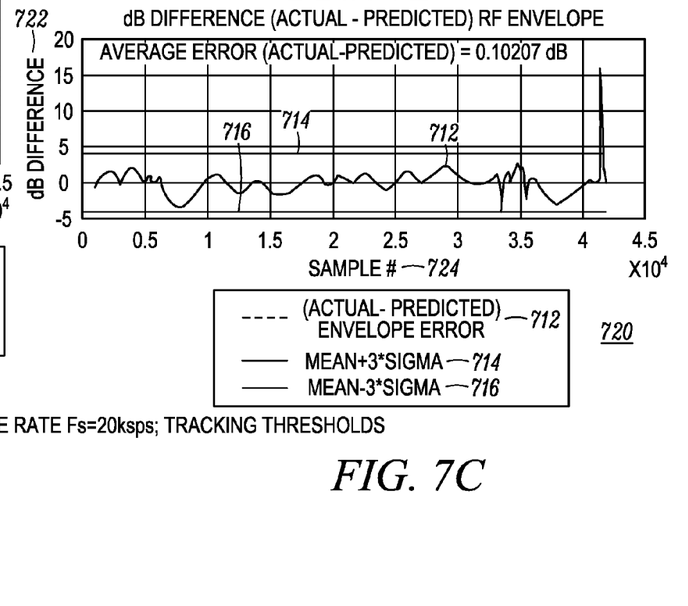
FIG. 7C shows an example of actual-predicted RF envelope average error in accordance with an embodiment of the invention.

FIG. 7B shows graph 710 of the detector slope variation 712 versus time 714, while FIG. 7C shows graph 720 of the dB error 722 versus sample time 724 for the actual-minus-predicted RF envelope 712 and the mean +/−3 sigma 714, 716. Thus, by allowing the output of the integrators 304, 314 of FIG. 3 to be variable and proportional to the integrated value of the true RF envelope, the error response was improved over that of the fixed threshold levels used in the example FIG. 6.

Accordingly, there has been provided a method and apparatus for improving signal reception in a receiver of a portable or mobile communication device by performing all-channel and on-channel estimations of a received signal so as to predict future RF environments. While shown in terms of a dual conversion receiver, the apparatus and method of the present invention applies equally as well to Direct Conversion Receivers (DCR). While shown and described with two detectors systems, the receiver can be implemented with one or more detector systems, each system containing a plurality of detectors. Each detector system can also be implemented without summers or integrators in applications where fixed SPI selectable thresholds are used. The receiver can be integrated into a single chip in which a simple control bus replaces the serial port interface.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for processing a received signal in a communication device, comprising the steps of:
   receiving a radio frequency (RF) signal;
   processing the RF signal though various receiver stages characterized by a front-end having active stages to produce a received digital signal and a back-end having at least one post-processing stage;

configuring the post processing stage to produce a predefined latency period in the received digital signal thereby providing a synchronous data signal;

detecting all-channel signals and on-channel signals within a dynamically scalable channel estimator prior to the post-processing stage to produce at least one pulse width modulated signal;

routing the pulse width modulated signal to a digital signal processor (DSP), the pulse width modulated signal path having a lower latency period than the post-processing stage;

evaluating the pulse width modulated signal to predict a receive signal operating environment prior to complete processing of the received digital signal by the post-processing stage; and adjusting at least one active stage after the post-processing stage based on the predicted receive signal operating environment to optimize receiver parameters synchronized to the synchronous data signal.

2. A radio receiver, comprising:

analog circuitry for receiving a radio frequency (RF) signal and generating an intermediate frequency (IF) signal;

an analog-to-digital converter (ADC) for converting the IF signal into a digital signal;

post-ADC digital circuitry for post-processing the digital signal thereby creating a predefined latency period in the digital signal;

a controller coupled to the post-ADC digital circuitry for further processing the latent digital signal;

a plurality of detectors coupled to the analog circuitry for creating at least one pulse width modulated signal containing RF envelope information of received all-channel information of the RF signal and for creating at least one pulse width modulated signal containing IF envelope information for received on-channel information of the IF signal prior to the ADC; and providing the pulse width modulated signals containing RF and IF envelope information to the controller, the controller calculating a predicted slope based on the pulse width modulated signals, the predicted slope representing the radio receiver's environment; and the post-ADC digital circuitry being adjusted in response to the predicted slope to optimize radio receiver parameters prior to receiving the digital signal.

3. The radio receiver of claim 2, wherein the plurality of detectors have fixed thresholds.

4. The radio receiver of claim 2, wherein the plurality of detectors have tracking thresholds.

5. The radio receiver of claim 2, wherein at least one detector provides a reference threshold tracking an integrator.

6. The radio receiver of claim 2, wherein the each of the plurality of detectors includes:

a plurality of reference detector offsets, an integrator, a plurality of summers; and a multi-level threshold detector.

7. The radio receiver of claim 6, wherein the plurality of detectors takes the received RF signal and compares it against multiple thresholds set at multi-level threshold detector with reference thresholds tracking an integrated value of the received RF signal.

8. A receiver, including:

analog receiver circuitry stage, an analog-to digital converter (ADC), digital post-processing stage having a predefined latency delay and DSP; and at least one detector system being coupled to the analog receiver circuitry stage prior to the ADC, the at least one detector system operating on an output signal of the analog receiver circuitry stage, the detector system having at least a first and second predetermined thresholds indicator, the at least one detector system providing a pulse width modulated signal to the DSP by a low latency connection bypassing the post processing stage the predetermined thresholds and time difference between transitions in the pulse width modulated signal being used to calculate received envelope slope prediction prior to the processing of the received signal being completed at the digital post-processing stage having the predefined latency delay.

9. The receiver of claim 8, wherein the first and second predetermined thresholds are fixed.

10. The receiver of claim 8, wherein the first and second predetermined thresholds are scalable relative to the detected all channel and on-channel signal strengths.

11. The receiver of claim 8, wherein adjustments are made to the receiver based on the predicted envelope slope by at least one of: scaling the first and second predetermined thresholds, adjusting integration periods of the at least one detector system; and adjusting the analog receiver circuitry stage.

12. The receiver of claim 11, wherein the ADC and post-processing latency stage are dynamically controlled based on input signal conditions reported by the at least one detector system.

13. The receiver of claim 11, wherein the analog receiver circuitry stage, the ADC and the post-processing latency stage are dynamically controlled based on channel conditions detected by the at least one detector system.

14. A radio having a receiver, comprising:

receiver front end hardware for receiving a radio frequency (RF) signal and generating an intermediate frequency (IF) signal;

a plurality of detectors coupled to the receiver front end hardware, the output of the plurality of detectors providing a plurality of pulse width modulated signals for generating channel envelope predictions;

an analog-to-digital converter (ADC) coupled to the receiver front end hardware;

a post processing section coupled to the ADC and generating a post processing sample having a predefined latency delay period; and a controller section coupled to the post processing section, the controller section including a digital signal processor (DSP) for receiving the plurality of pulse width modulated signals from the plurality of detectors prior to receiving the post processing sample having the predefined latency period, the DSP calculating a predicted slope from the channel envelope predictions, the predicted slope being used to adjust the controller section prior to arrival of the post processing sample.

15. The receiver of claim 14, wherein the DSP scales forward-error-correction (FEC) parameters in response to the channel metric information.

16. The receiver of claim 14, wherein the forward-error-correction parameters include block coding vectors.

17. The receiver of claim 14, wherein the forward-error-correction parameters include convolution coding vectors.

18. The receiver of claim 14, wherein the DSP selectively engages soft-decoding algorithms and hard decoding algorithms in response to the channel metric information.

19. The receiver of claim 14, wherein the DSP schedules interrupt service requests (ISRs) in response to the channel metric information.

20. The receiver of claim 14, wherein the channel metric information provided by the plurality of detectors is used to scale active stages within the receiver for maximum linearity.

21. The receiver of claim 14, wherein the channel metric information provided by the plurality of detectors is used to conserve current when environmental conditions warrant.

22. The receiver of claim 14, wherein further adjustments are made to the receiver based on the predicted slope by utilizing at least one of: scaling thresholds set by the plurality of detectors, adjusting integration periods set by the plurality of detectors; adjusting the receiver front-end hardware; adjusting the post processing section; adjusting the ADC; and adjusting functions of the controller section.

23. The receiver of claim 8, wherein adjustments are made to the receiver based on the predicted envelope slope to at least one of: the digital post-processing stage; and DSP.

* * * * *

UNITED STATES PATENT AND TRADEMARK OFFICE
CERTIFICATE OF CORRECTION

PATENT NO. : 7,684,516 B2  
APPLICATION NO. : 11/380892  
DATED : March 23, 2010  
INVENTOR(S) : Salvi et al.

Page 1 of 1

It is certified that error appears in the above-identified patent and that said Letters Patent is hereby corrected as shown below:

Title page, item (56), under "OTHER PUBLICATIONS", in Column 2, Line 4, delete "PCT/U52007" and insert -- PCT/US2007 --, therefor.

Column 6, Line 7, delete "(TDM)" and insert -- (TDMA) --, therefor.

Column 6, Line 10, delete "(FDM)" and insert -- (FDMA) --, therefor.

Column 6, Lines 45, 49, 54 & 56, delete "hysterisis" and insert -- hysteresis --, therefor.

Signed and Sealed this  
First Day of May, 2012

David J. Kappos  
*Director of the United States Patent and Trademark Office*